Dec. 6, 1949   S. L. MASTEN   2,490,144
ARTICLE MIXING AND DISPENSING APPARATUS
Filed Feb. 19, 1947

INVENTOR
Seymere L. Masten
BY Richard J. Newling
ATTORNEY

Patented Dec. 6, 1949

2,490,144

UNITED STATES PATENT OFFICE 2,490,144

ARTICLE MIXING AND DISPENSING APPARATUS

Seymere L. Masten, Monsey, N. Y.

Application February 19, 1947, Serial No. 729,553

6 Claims. (Cl. 273—144)

1

The present invention is related generally to an article mixing and dispensing apparatus, and more particularly it has relation to an apparatus suitable for mixing and dispensing a plurality of articles in a controlled manner, such as balls, chips and the like, as in a lotting device.

An object of the present invention is to provide a novel apparatus capable of mixing thoroughly a plurality of articles and delivering them one at a time as desired.

Another object of the invention is the provision of a simple, efficient and inexpensive apparatus which is capable of thoroughly and efficiently mixing a plurality of articles and thereafter dispensing them in suitable spaced relation.

A further object of the invention is to provide a novel mixing and dispensing apparatus which will thoroughly mix a plurality of articles when the same is rotated in one direction and which will dispense said mixed articles as desired when rotated in the opposite direction.

Other and further objects and advantages of the invention reside in the detailed construction of the apparatus, which result in simplicity, economy and efficiency, and which will be apparent from the following description, wherein one embodiment of the invention is shown, reference being had to the accompanying drawings forming a part hereof, wherein like numerals indicate like parts, in which.

It will be readily apparent that the mixing and dispensing apparatus herein described may be constructed of wood, metal, plastics and/or combinations of such materials, or any other materials found to be suitable for the purpose, and that the size of the several openings should correspond to the size of the article to be mixed or dispensed so that only one article at a time may fit therein and be passed therethrough.

2

Figure 4:
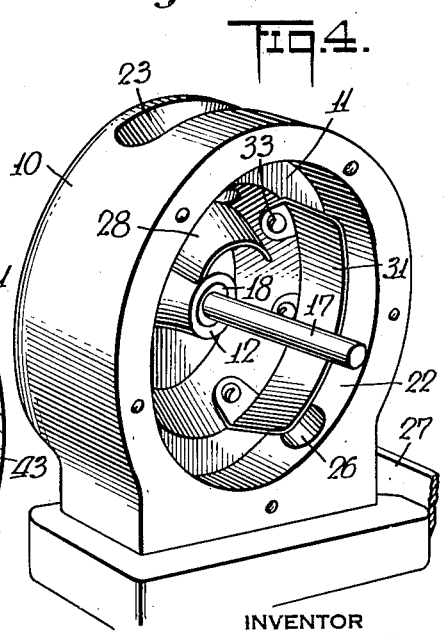
Figure 4 is a fragmentary perspective view of the stationary casing, looking into its concavity and showing the arrangement of its several guards.

Referring now to the drawings, and particularly to Figure 4 thereof, there is shown a portable stationary casing 10, having a concavity 11 therein which is open along one side and is of substantially semi-spherical shape. The concavity 11 has an axial projection 12 having an axial bore 13, which is enlarged adjacent the free end thereof, as indicated at 16. The shaft 17 has a radial flange 18 formed integrally therewith intermediate its ends adapted to fit within the enlarged portion 16 of the axial bore 13, and has one end threaded for receiving a nut 19 by means of which it is mounted fixedly in the bore 13 of the projection 12. It will be noted that the free end of the shaft 17 projects outwardly of the casing 10 a distance sufficient to receive operatively a rotating drum 21 to be hereinafter described in detail. The concavity 11 is provided with an inner annular radial recess adjacent its circumferential or peripheral edge, as indicated at 22.

The casing 10 is provided with an inlet opening 23 adjacent its top side for receiving articles 24 to be mixed and dispensed thereby, and is also provided with a suitable outlet or discharge opening 26 adjacent its bottom and within the recess 22 through which the articles 24 may be dispensed or discharged when desired. A suitable trough 27 is adapted to be mounted removably adjacent the outlet 26 for receiving and delivering the articles 24 discharged therefrom.

A stationary guard or plate 28 of arcuate shape is mounted within the concavity 11 of the casing 10 by means of a screw 29 immediately below the inlet opening 23 to provide suitable means for protecting the mixing chamber and contents from inspection at all times. The spacing of the arcuate guard plate 28 with respect of the inlet opening 23 will be controlled by the size of the articles 24 to be mixed and dispensed by the apparatus. It will be obvious that sufficient clearance must be provided for the articles 24 to pass between the top of the guard plate 28 and the inner surface of the casing 10.

Figure 3:
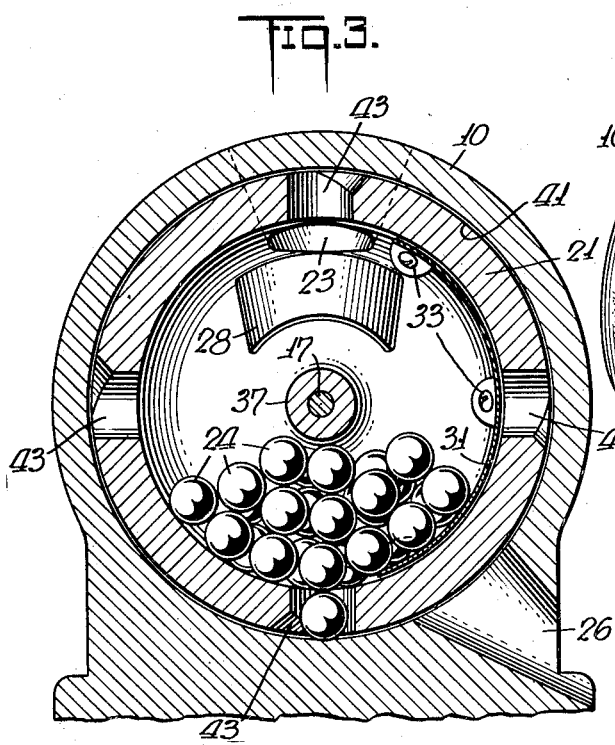
Figure 3 is a longitudinal sectional view of the apparatus shown in Figure 2, the same having been taken substantially along the line 3—3 thereof, looking in the direction of the arrows.

A second stationary guard or plate 31, which is also of arcuate shape, is mounted within the casing 10 by means of a series of spaced screws 33. The lower end of the guard 31 is adapted to cover the outlet or discharge opening 26, and it extends upwardly concentrically and is spaced radially inwardly with respect of the annular recess 22 to a point substantially to the top of the concavity 11 of the casing 10, as best shown in Figures 3 and 4. The radial spacing of the plate or guard 31 with respect of the recess 22 is sufficient to permit the passage of a flanged portion of the drum 21 when the same is positioned therein.

The rotating drum 21 is of substantially hemispherical shape, and has a concavity 35 therein which is also open along one side. The concavity 35 is provided with an axial projection 37 having an axial bore 39 adapted to receive the projecting free end of the shaft 17 of the casing 10 when the same is mounted operatively thereon. When the drum 21 is mounted operatively on the shaft 17 within the casing 10, the two concavities 11 and 35 form a unitary mixing chamber of substantially spheroidal shape. It will be noted that the outer peripheral or circumferential edge of the drum 21 is flanged axially or horizontally, as indicated at 41, which flanged portion is adapted to fit rotatably within the inner recess 22 of the casing 10 when the drum 21 is positioned operatively on the shaft 17. A series of circumferentially spaced radial delivery openings 43 extend through the flanged portion 41 of the drum 21, which are adapted to become aligned one at a time with the outer or discharge opening 26 as the drum is being rotated. The drum 21 is held in position on the shaft 17 and within the concavity 11 of the casing 10 by means of an annular collar 45, which is secured removably to the casing 10 by suitable circumferentially spaced screws 47. The drum 21 is provided with an exterior handle 49 mounted eccentrically thereof for manipulating the same.

In the assembly of the apparatus, the shaft 17 is first positioned in the bore 13 of the axial projection 12 with its flange 18 within the recess 16 thereof. The nut 19 is then threaded on its outer end and drawn tight until the shaft 17 is mounted fixedly in the projection 12. The drum 21 is now positioned on the shaft 17 until its flange 41 is positioned within the recess 22 of the casing 10. In this position, it will be noted that the flange 41 extends under the arcuate stationary guard 31. The fastening collar 45 is now ready to be secured by its screws 47 to the casing 10, which holds the drum 21 in position on the shaft 17 so that no other securing means is needed on the free end of the shaft 17 projecting into the bore 39.

The articles 24 to be mixed and dispensed may now be dropped into the inlet opening 23, whereupon they will gravitate around and below the guard 28 to the bottom of the mixing chamber. Any number of articles may be positioned in the mixing chamber just as long as they are not stacked above the top of the guard 31, which would permit them to drop into the openings 43 as they pass under said guard. The apparatus is now ready for manipulation.

Figure 1:
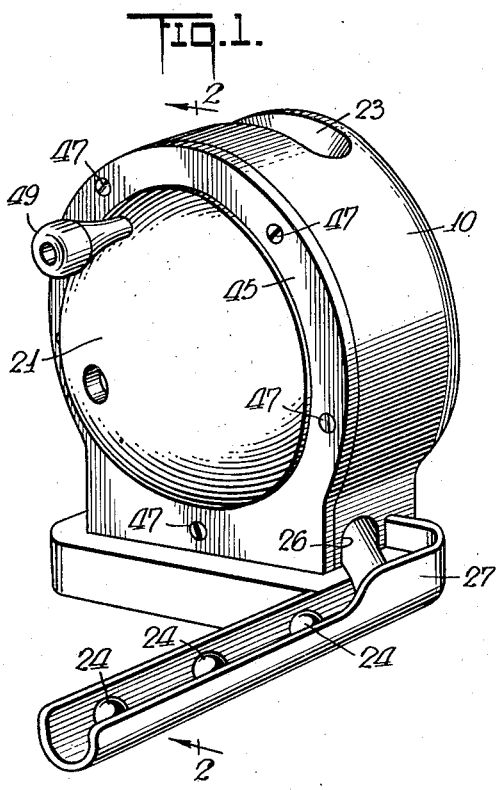
Figure 1 is a perspective view of an article mixing and dispensing apparatus constructed in accordance with the principles of the invention.
Figure 2:
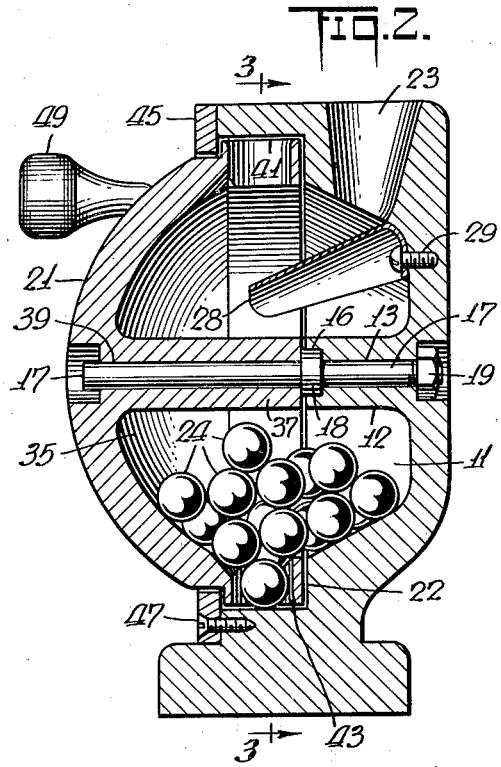
Figure 2 is a cross-sectional view of the apparatus shown in Figure 1, the same having been taken substantially along the line 2—2 thereof, looking in the direction of the arrows.

Assuming the apparatus is in the position shown in Figure 1, and the drum 21 is turned by means of its handle 49 in a clockwise direction, the articles 24 in the mixing chamber will be thoroughly mixed. Each of the delivery openings 43 in the flanged portion 41 of the drum 21 will carry an article 24 upwardly until it falls out by the action of gravity as it nears the top of the chamber, whereupon such articles 24 will fall back on the top of the pile. The empty opening 43 will not become refilled with another article until after it returns to the bottom of the mixing chamber and until after it emerges from under the guard plate 31, as best shown in Figure 3. When the drum 21 is rotated in a counter-clockwise direction, each opening 43 will receive a single article at the bottom of its movement and from the bottom of the pile, and will carry the article 24 under the guard plate 31 to the discharge outlet 26. When the opening 43 containing the article 24 becomes aligned with the discharge outlet 26, the article 24 will gravitate therethrough into the trough 27. It will be noted that the stationary guard plate 31 is mounted across said discharge outlet 26 and extends above and substantially adjacent to said flange 21 at a distance such that only one article at a time may be received in each delivery opening 43 for delivery to the discharge outlet 26. In the construction shown, rotation of the drum 21 through a quarter turn will dispense one article; rotation through a half turn will dispense two articles; rotation through a three-quarters turn will dispense three articles; and a full circle turn will dispense four articles. It will be obvious that continuous rotation of the drum 21 will dispense all of the articles that have been positioned therein in a definite spaced relation such as shown in Figure 1, and that the speed of rotation within suitable operating limits will determine the amount of space between each of the discharged articles. It is to be understood, however, that the apparatus is not limited to the specific embodiment shown, and that the number of discharge openings in the drum may be varied as required or desired.

Although I have described in detail only one embodiment of the invention, it will be readily apparent to those skilled in the art that the invention is not so limited, but that various modifications may be made therein without departing from the spirit thereof or from the scope of the appended claims.

What I claim is:

1. An article mixing and dispensing apparatus comprising a stationary casing and a rotatable drum each having a concavity along one side, said drum adapted to be mounted slightly within the concavity of the casing whereby their respective concavities form a single closed mixing chamber, an inlet adjacent the top of said apparatus for receiving articles for said mixing chamber, an outlet adjacent the bottom of said casing and below that portion of the drum within said casing, said drum having a series of spaced delivery openings through that portion of its circumferential flange projecting into said casing adapted to become aligned one at a time with said outlet when the drum is rotated, a guard mounted within said mixing chamber across said outlet and above and adjacent said flange at a distance such that only one article at a time may be received in said delivery openings, said guard preventing the discharge of said articles when the drum is rotated in one direction and adapted to pass only one article at a time to said outlet opening when said drum is rotated in the opposite direction, and manipulating means for rotating said drum with respect of said casing.

2. An article mixing and dispensing apparatus comprising a stationary casing having a horizontally extending axial shaft and a drum mounted rotatably thereon, said casing and drum each having a concavity along one side, said drum adapted to be mounted on said shaft with its circumferential flange extending within the concavity of said casing whereby their respective concavities form substantially a spheroidal mixing chamber, an inlet adjacent the top for receiving articles for said mixing chamber, an outlet adjacent the bottom of said casing and under the circumferential flange of said drum extending within said casing, said drum having a series of spaced radial delivery openings through said flange which are adapted to become aligned with said outlet when the drum is rotated, an arcuate guard mounted within said mixing chamber across said outlet and above and adjacent said flange at a distance such that only one article at a time may be received in each delivery opening, said guard preventing the discharge of said articles when the drum is rotated in one direction and adapted to pass only one article at a time to said outlet opening when said drum is rotated in the opposite direction, and manipulating means for rotating said drum with respect of said casing.

3. An article mixing and dispensing apparatus comprising a stationary casing having a concavity along one side and a horizontal shaft extending axially of said concavity, and a drum having a concavity along one side adapted to be mounted rotatably on said shaft and having a circumferential flange adapted to extend slightly into the concavity of said casing, said concavities adapted to form a closed mixing chamber when said casing and drum are assembled, an inlet adjacent the top of said mixing chamber for receiving articles, an outlet adjacent the bottom of said casing and below said flange, a series of spaced delivery openings extending through the flange of said drum which are adapted to become aligned with said outlet when the drum is rotated, an arcuate guard mounted within said mixing chamber across said outlet and above and adjacent said flange at a distance such that only one article at a time may be received in each delivery opening, said guard preventing the discharge of said articles when the drum is rotated in one direction and adapted to pass only one article at a time to said outlet opening when said drum is rotated in the opposite direction, and a handle for rotating said drum.

4. An article mixing and dispensing apparatus comprising a stationary casing having a concavity along one side and a horizontal shaft extending axially thereof, and a drum having a concavity along one side adapted to be mounted rotatably on said shaft and having a circumferential flange adapted to extend a short distance into the concavity of said casing, said concavities adapted to form a closed mixing chamber when said casing and drum are assembled, an inlet adjacent the top of said casing for receiving articles for said mixing chamber, a guard mounted within said casing and below said inlet to prevent inspection of said mixing chamber, an outlet adjacent the bottom of said casing and below the circumferential flange of said drum, a series of spaced radial delivery openings extending through the flange of said drum which are adapted to become aligned with said outlet when the drum is rotated, an arcuate guard mounted within said mixing chamber across said outlet and above and adjacent said flange at a distance such that only one article at a time may be received in each delivery opening, said guard preventing the discharge of said articles when the drum is rotated in one direction and adapted to pass only one article at a time to said outlet opening when said drum is rotated in the opposite direction, and a handle for rotating said drum.

5. An article mixing and dispensing apparatus comprising a stationary casing having a concavity therein, said casing having a shaft extending axially of said concavity and having a circumferentially extending recess interiorly of its outer edge, and a drum having a concavity therein provided with a circumferential flange adapted to fit within the recess of said casing when the drum is mounted rotatably on said shaft, said concavities upon assembly forming an annular mixing chamber, an inlet adjacent the top of said apparatus for receiving articles for said mixing chamber, an outlet adjacent the bottom of said casing, a series of circumferentially spaced radial delivery openings extending through the flange of said drum which are adapted to become aligned one at a time with said outlet as the drum is being rotated, an arcuate guard mounted within said mixing chamber across said outlet and above and adjacent said flange at a distance such that only one article at a time may be received in each delivery opening, said guard preventing the discharge of said articles when the drum is rotated in one direction and adapted to pass only one article at a time to said outlet opening when said drum is rotated in the opposite direction, and a handle for rotating said drum.

6. An article mixing and dispensing apparatus comprising a stationary casing having a concavity therein, said casing having a shaft extending axially of its concavity and having an annular interior recess adjacent its edge, and a drum having a concavity therein provided with a circumferential flange adapted to fit within the recess of said casing when the drum is mounted on said shaft, said concavities upon assembly forming an annular mixing chamber an inlet adjacent the top of said apparatus for receiving articles for said mixing chamber, a stationary guard within said mixing chamber and spaced from said inlet for preventing an inspection of said chamber, an outlet adjacent the bottom of said casing, a series of circumferentially spaced radial delivery openings extending through the flange of said drum which are adapted to become aligned one at a time with said outlet as the drum is being rotated, an arcuate guard mounted within said mixing chamber across said outlet and above and adjacent said flange at a distance such that only one article at a time may be received in each delivery opening, said guard preventing the discharge of articles when the drum is rotated in one direction and adapted to pass only one article at a time to said outlet opening when said drum is rotated in the opposite direction, and a handle for rotating said drum on said shaft.

SEYMERE L. MASTEN.

REFERENCES CITED

The following references are of record in the file of this patent:

UNITED STATES PATENTS

| Number | Name | Date |
|---|---|---|
| 1,127,520 | Rosen | Feb. 9, 1915 |
| 1,929,788 | Myers et al. | Oct. 10, 1933 |
| 2,349,623 | Hickey | May 23, 1944 |